United States Patent Office 3,792,168
Patented Feb. 12, 1974

3,792,168
ETHYNYLENE CONTAINING N-PHENYL CARBAMATES AND THEIR USE AS ACARICIDES AND INSECTICIDES
Don R. Baker, Orinda, Calif., assignor to Stauffer Chemical Company, New York, N.Y.
No Drawing. Original application Aug. 1, 1969, Ser. No. 846,920, now Patent No. 3,660,465. Divided and this application Sept. 7, 1971, Ser. No. 178,486
Int. Cl. A01n 9/20
U.S. Cl. 424—300
7 Claims

ABSTRACT OF THE DISCLOSURE

Compounds of the formula

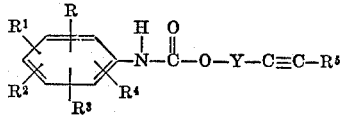

in which R is
(a) hydrogen,
(b) alkyl,
(c) nitro,
(d) halo,
(e) hydroxy,
(f) alkoxy,
(g) alkylthio, or
(h) phenyl,
$R^1$ is
(a) hydrogen,
(b) alkyl,
(c) nitro,
(d) halo,
(e) hydroxy, or
(f) alkoxy,
$R^2$ is
(a) hydrogen,
(b) methyl,
(c) halo, or
(d) alkoxy,
$R^3$ is
(a) hydrogen,
(b) methyl, or
(c) halo,
$R^4$ is
(a) hydrogen,
(b) methyl, or
(c) halo,
Y is a divalent lower alkenyl, lower alkynyl or lower alkyl radical either straight or branched chain, and $R^5$ is an alkyl, cycloalkyl or alkenyl group and their use as acaricides and insecticides.

---

This is a division of application Ser. No. 846,920, now U.S. Pat. 3,660,465, filed Aug. 1, 1969.

This invention relates to certain novel ethynylene containing N-phenyl carbamates and to their use as acaricides and insecticides.

Acarids, especially mites, are a serious problem in agriculture and horticulture. They are widely distributed throughout the world and in the United States they are known to attack a wide variety of plants, poultry and livestock. Few other pests cause greater damage to so wide a range of hosts.

A considerable assortment of acaricidal materials have been suggested and investigated for the control of the acarid organisms. It is also known that certain organisms are capable of development resistance to certain classes of acaricides. Therefore, there exists a continuing search for new materials to control the aforementioned pests, wherein the capability to establish resistance is decreased and satisfactory control can be realized.

The compounds of the present invention are especially valuable as acaricides because they have little or no phytotoxic properties. Thus, acarids that host on plants can be controlled without injury to the plant.

The compounds of this invention are those of the formula

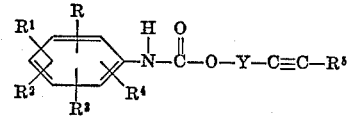

in which R is selected from the group consisting of
(a) hydrogen,
(b) alkyl, preferably 1 to 4 carbon atoms,
(c) nitro,
(d) halo,
(e) hydroxy,
(f) alkoxy, preferably 1 to 4 carbon atoms,
(g) alkylthio, preferably 1 to 4 carbon atoms, more preferably methylthio, or
(h) phenyl, preferably 4-phenyl,
$R^1$ is selected from the group consisting of
(a) hydrogen,
(b) alkyl, preferably 1 to 4 carbon atoms, more preferably methyl,
(c) nitro,
(d) halo,
(e) hydroxy, or
(f) alkoxy, preferably 1 to 4 carbon atoms, more preferably methoxy,
$R^2$ is selected from the group consisting of
(a) hydrogen,
(b) methyl,
(c) halo, or
(d) alkoxy, preferably 1 to 4 carbon atoms, more preferably methoxy,
$R^3$ is selected from the group consisting of
(a) hydrogen,
(b) methyl, or
(c) halo,
$R^4$ is selected from the group consisting of
(a) hydrogen,
(b) methyl, or
(c) halo, Y is a divalent lower alkyl, lower alkenyl or lower alkynyl, either radical straight or branched chain, preferably having from 1 to 6 carbon atoms, most preferably Y is methylene, and $R^5$ is a member selected from the group consisting of alkyl, preferably having from 1 to 8 carbon atoms, cycloalkyl, preferably cyclohexyl and alkenyl, preferably having from 2 to 4 carbon atoms, most preferably $R^5$ is methyl.

Representative compounds of this invention are:

4-chlorophenylcarbamyloxy-2-butyne
4-chlorophenylcarbamyloxy-2-pentyne
4-chlorophenylcarbamyloxy-2-hexyne
4-chlorophenylcarbamyloxy-3-pentyne
4-chlorophenylcarbamyloxy-4-hexyne
2-chlorophenylcarbamyloxy-2-butyne
3-chlorophenylcarbamyloxy-2-butyne
4-bromophenylcarbamyloxy-2-butyne
4-fluorophenylcarbamyloxy-2-butyne
3,4-dichlorophenylcarbamyloxy-2-butyne
2,4-dichlorophenylcarbamyloxy-2-butyne
2,6-dichlorophenylcarbamyloxy-2-butyne
2-bromo-4-methylphenylcarbamyloxy-2-butyne
2-bromo-4-nitrophenylcarbamyloxy-2-butyne 4-chloro-2,5-dimethoxyphenylcarbamyloxy-2-butyne
3-chloro-4-fluorophenylcarbamyloxy-2-butyne
3-chloro-4-methylphenylcarbamyloxy-2-butyne
2-chloro-4-nitrophenylcarbamyloxy-2-butyne
4-chloro-2-nitrophenylcarbamyloxy-2-butyne
2-hydroxyphenylcarbamyloxy-2-butyne
3-hydroxyphenylcarbamyloxy-2-butyne
4-hydroxyphenylcarbamyloxy-2-butyne
2-methylphenylcarbamyloxy-2-butyne
3-methylphenylcarbamyloxy-2-butyne
4-methylphenylcarbamyloxy-2-butyne
4-ethylphenylcarbamyloxy-2-butyne
4-iodophenylcarbamyloxy-2-butyne
4-methoxy-2-methylphenylcarbamyloxy-2-butyne
2-methoxy-4-nitrophenylcarbamyloxy-2-butyne
2-methoxy-3-nitrophenylcarbamyloxy-2-butyne
4-phenylphenylcarbamyloxy-2-butyne
4-methylthiophenylcarbamyloxy-2-butyne
4-chloro-2,5-dimethoxyphenylcarbamyloxy-2-butyne
2,4,5-trichlorophenylcarbamyloxy-2-butyne
3,4,5-trimethoxyphenylcarbamyloxy-2-butyne
2,4,6-trimethylphenylcarbamyloxy-2-butyne
2,3,4,5-tetrafluorophenylcarbamyloxy-2-butyne
2,3,5,6-tetrafluorophenylcarbamyloxy-2-butyne
4-n-butylphenylcarbamyloxy-2-butyne The most preferred compounds are 4-chlorophenylcarbmyloxy-2-butyne, which has the formula

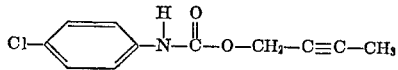

and 2,4-dichlorophenylcarbamyloxy-2-butyne, which has the formula

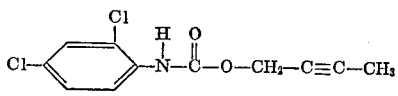

The compounds of this invention can be prepared according to the following reaction

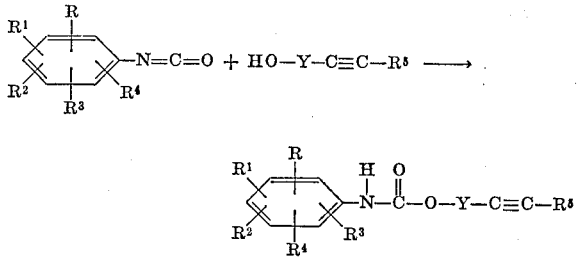

in which R, $R^1$, $R^2$, $R^3$, $R^4$, Y and $R^5$ are defined as above.

The molar ratio of the reactants may fall within the range of from about 0.5 to 2 moles isocyanate per mole of the alcohol; however, in preferred operation, the stoichiometric molar ratio of 1 mole isocyanate per mole of the alcohol is employed.

The reaction temperature may vary over a wide range, i.e., from about —20° C. up to the boiling point of the reaction mixture. In preferred operation, however, reaction temperatures from about room temperature up to about 60° C. are employed. The reaction is of an exothermic nature, and the time of reaction may vary over a wide range. Highest yields are secured, however, with a reaction time of from about ½ to 1 hour. Preferably, the reaction should be run under anhydrous conditions.

It is desirable to employ a suitable solvent in order to facilitate the obtainment of a homogeneous reaction mixture and also to secure ease of reaction. Any solvent may be utilized provided it is a solvent for the reactants, and is inert under the conditions of reaction. Ether, benzene, chloroform, and carbon tetrachloride are useful as a solvent.

Preferably catalytic amounts of such catalysts are dibutyl tin dilaurate and triethyl amine or mixtures thereof should be used.

The reaction products can be recovered and purified, if necessary, by conventional means well-known to those skilled in the art.

EXAMPLE I 4-chlorophenylcarbamyloxy-2-butyne 17.6 grams (0.25 mole) 2-butyn-1-ol, 2 drops dibutyl tin dilaurate, 4 drops triethyl amine are mixed in 150 ml. dry ethyl with vigorous stirring in a flask. 38.6 grams (0,25 mole) p-chlorophenyl isocyanate dissolved in 100 ml. of dry ether is added slowly to the flask with some exothermic reaction and is heated at reflux for ½ hour. The reaction mixture is then cooled and the white reaction product precipitated. The product is recovered and washed with hexane, M.P. 124–126° C. The yield is 44.1 grams. Analysis of the product is in agreement with the structure of the title compound.

Table I lists other compounds that are prepared according to the procedure described in Example I.

TABLE I

| Compound number | R | $R^1$ | $R^2$ | $R^3$ | $R^4$ | Y | $R^5$ | $N_D^{30}$ or M.P.,° C. |
|---|---|---|---|---|---|---|---|---|
| 1[1] | 4-chloro | | H | H | H | —$CH_2$— | $CH_3$— | 124–126 |
| 2 | do | 3-chloro | H | H | H | —$CH_2$— | $CH_3$— | 116–118 |
| 3 | 4-bromo | H | H | H | H | —$CH_2$— | $CH_3$— | 129–131 |
| 4 | 2-chloro | 5-chloro | H | H | H | —$CH_2$— | $CH_3$— | 89–90 |
| 5 | 4-$OCH_3$ | H | H | H | H | —$CH_2$— | $CH_3$— | 73–75 |
| 6 | 4-$CH_3$ | H | H | H | H | —$CH_2$— | $CH_3$— | 72–74 |
| 7 | H | 2-Cl | H | H | H | —$CH_2$— | $CH_3$— | 1.5562 |
| 8 | 3-Cl | H | H | H | H | —$CH_2$— | $CH_3$— | 68–69 |
| 9 | H | H | H | H | H | —$CH_2$— | $CH_3$— | 61–63 |
| 10 | H | 2-$OCH_3$ | H | H | H | —$CH_2$— | $CH_3$— | 44–46 |
| 11 | H | 3-$CH_3$ | H | H | H | —$CH_2$— | $CH_3$— | 1.5373 |
| 12 | 2-$CH_3$ | H | H | H | H | —$CH_2$— | $CH_3$— | 56–58 |
| 13 | 2-$CH_3$ | 5-$CH_3$ | H | H | H | —$CH_2$— | $CH_3$— | 113–115 |
| 14 | 2-$NO_2$ | H | H | H | H | —$CH_2$— | $CH_3$— | 104–106 |
| 15 | H | 4-F | H | H | H | —$CH_2$— | $CH_3$— | 102–105 |
| 16 | 4-$SCH_3$ | H | H | H | H | —$CH_2$— | $CH_3$— | 49–51 |
| 17 | 3-Cl | 4-$CH_3$ | H | H | H | —$CH_2$— | $CH_3$— | 101–103 |
| 18 | 2-$CH_3$ | 4-Br | H | H | H | —$CH_2$— | $CH_3$— | 125.5–127.5 |
| 19 | 2-$CH_3$ | 4-Cl | H | H | H | —$CH_2$— | $CH_3$— | 112–114 |
| 20 | 2-$CH_3$ | 3-Cl | H | H | H | —$CH_2$— | $CH_3$— | 93–95 |
| 21 | 2-Cl | 4-Cl | H | H | H | —$CH_2$— | $CH_3$— | 88–91 |
| 22 | 2-Br | 4-$CH_3$ | H | H | H | —$CH_2$— | $CH_3$— | 60–62 |
| 23 | 2-Cl | 3-Cl | H | H | H | —$CH_2$— | $CH_3$— | 92–94 |
| 24 | 2-Cl | 5-$CH_3$ | H | H | H | —$CH_2$— | $CH_3$— | 72–74 |

[1] Prepared in Example I.

ACARICIDAL EVALUATION TEST

The two-spotted mite, *Tetranychus telarius* (Linn.), was employed in tests for acaricides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent, the amount of water being sufficient to give concentrations of active ingredient ranging from 0.25% to 0.001%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. These values are reported under the columns "PE" and "Eggs" in Table II.

TABLE II

| Compound number | Acaricidal activity | |
|---|---|---|
| | PE | Eggs |
| 1 | 0.003 | 0.008 |
| 2 | >0.5 | >0.5 |
| 3 | 0.01 | 0.01 |
| 4 | 0.03 | 0.03 |
| 5 | 0.05 | 0.05 |
| 6 | 0.03 | 0.03 |
| 7 | 0.05 | 0.03 |
| 8 | 0.03 | 0.03 |
| 9 | 0.05 | 0.03 |
| 10 | 0.03 | 0.03 |
| 11 | 0.03 | 0.03 |
| 12 | 0.03 | 0.03 |
| 13 | 0.03 | 0.03 |
| 14 | 0.03 | 0.03 |
| 15 | 0.008 | >0.05 |
| 16 | >0.05 | >0.05 |
| 17 | 0.01 | >0.05 |
| 18 | 0.01 | >0.05 |
| 19 | 0.005 | >0.05 |
| 20 | 0.005 | 0.03 |
| 21 | 0.003 | 0.01 |
| 22 | 0.03 | 0.03 |
| 23 | 0.03 | 0.03 |
| 24 | 0.03 | 0.03 |

INSECTICIDAL EVALUATION TEST

Leaves of curled dock, *Rumex crispus*, which contain masses of eggs of the dock beetle, *Gostroidea cyanea*, are dipped in various concentrations by weight of a candidate chemical compound suspended in water. Untreated and treated leaves are placed in separate Petri dishes which contain moistened filter paper and after one week, they are observed for the presence of newly emerged larvae. The LD–50 values are calculated. Results of the test are tabulated in Table III.

TABLE III

| Compound | Percent emergence of dock beetle larvae concentration (percent) | | | | | $LD_{50}$, percent |
|---|---|---|---|---|---|---|
| | .001 | .005 | .01 | .05 | 0.1 | |
| 1 | 100 | 100 | 100 | 0 | 0 | 0.03 |

100% emergence of the larvae is observed with the untreated leaves, which are used as a control.

Various techniques or methods can be employed for contacting mites or insect eggs with the carbamate compounds. For example, spray formulations can be prepared by dissolving the carbamate in suitable organic solvent such as toluene, xylene, benzene and the like, and subsequent dispersion of this solution in water in the presence of a surface active wetting or emulsifying agent. Another method by which the acaricidal or insecticidal agents of the present invention can be applied is in the form of dispersible powders, preferably as homogeneous free-flowing dusts commonly formulated by mixing the active component with finely divided solids or carriers such as talc, natural clays, diatomaceous earth, various flours such as walnut shell, wheat and the like. The details of compounding and application are well-known to those skilled in the art.

What is claimed is:

1. A method of controlling acarids comprising applying thereto an acaricidally effective amount of a compound having the formula

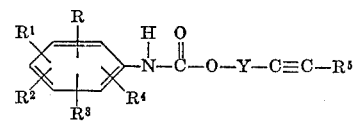

in which R is selected from the group consisting of
(a) hydrogen,
(b) methyl,
(c) nitro,
(d) halo,
(e) methoxy and
(f) methylthio;

$R^1$ is selected from the group consisting of
(a) hydrogen,
(b) methyl, and
(c) halo;

$R^2$ is hydrogen;
$R^3$ is hydrogen;
$R^4$ is hydrogen;
Y is methylene and $R^5$ is methyl.

2. The method of claim 7 in which R is halo, and $R^1$ is hydrogen.

3. The method of claim 7 in which R is halo, and $R^1$ is halo.

4. The method of claim 1 in which R is methoxy, and $R^1$ is hydrogen.

5. The method of claim 2 in which R is 4-chloro.

6. The method of claim 3 in which R is 2-chloro and $R^1$ is 4-chloro.

7. A method of controlling insects comprising applying thereto an insecticidally effective amount of the compound having the formula

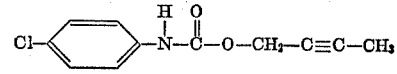

References Cited

UNITED STATES PATENTS 3,203,949  8/1965  Hopkins et al. _____ 424—300

ALBERT T. MEYERS, Primary Examiner

V. D. TURNER, Assistant Examiner

U.S. Cl. X.R.

260—471